US012055876B2

(12) United States Patent
Ishida

(10) Patent No.: US 12,055,876 B2
(45) Date of Patent: Aug. 6, 2024

(54) FIXING DEVICE AND IMAGE FORMING APPARATUS

(71) Applicant: BROTHER KOGYO KABUSHIKI KAISHA, Nagoya (JP)

(72) Inventor: Kei Ishida, Inuyama (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/046,366

(22) Filed: Oct. 13, 2022

(65) Prior Publication Data

US 2023/0118827 A1 Apr. 20, 2023

(30) Foreign Application Priority Data

Oct. 15, 2021 (JP) ................................ 2021-169881

(51) Int. Cl.
*G03G 15/20* (2006.01)

(52) U.S. Cl.
CPC ................................ *G03G 15/2039* (2013.01)

(58) Field of Classification Search
CPC .................................................. G03G 15/2039
See application file for complete search history.

(56) References Cited

U.S. PATENT DOCUMENTS

2015/0139706 A1 5/2015 Fujiwara et al.
2015/0227091 A1 8/2015 Ando et al.
2016/0098001 A1 4/2016 Ogawa et al.
2016/0139551 A1* 5/2016 Narahara ........... G03G 15/2042 399/33

FOREIGN PATENT DOCUMENTS

JP 2015-99190 A 5/2015
JP 2016-71284 A 5/2016
JP 2017-199024 A 11/2017
JP 2018-136392 A 8/2018

* cited by examiner

*Primary Examiner* — Stephanie E Bloss
*Assistant Examiner* — Michael A Harrison
(74) *Attorney, Agent, or Firm* — Merchant & Gould P.C.

(57) ABSTRACT

A fixing device includes a heater including a substrate and a resistance heating element, an endless belt, a holder, a first heat conductive member and a second heat conductive member arranged in a longitudinal direction of the heater such that a first end of the first heat conductive member and a second of the second heat conductive member in the longitudinal direction of the heater are adjacent to each other, a temperature sensor configured to detect a temperature at an end part of the heater. The temperature sensor is in contact with the first heat conductive member. A position located between first end of the first heat conductive member and the second end of the second heat conductive member is closer to the temperature sensor than a central position of the resistance heating element in the longitudinal direction of the heater.

14 Claims, 10 Drawing Sheets

FIXING DEVICE AND IMAGE FORMING APPARATUS

REFERENCE TO RELATED APPLICATIONS

The present application claims priority from Japanese Patent Application No. 2021-169881, which was filed on Oct. 15, 2021, the disclosure of which is herein incorporated by reference in its entirety.

BACKGROUND ART

The following disclosure relates to a fixing device and an image forming apparatus.

There has been known a conventional image forming apparatus, such as an electrophotographic type printer, including a fixing device configured to fix a developer image by heating a sheet on which the image is to be formed. The fixing device normally includes a heater having a resistance heating element, and a temperature sensor configured to detect a temperature of the heater. The fixing device controls a fixing temperature by the heater based on a detected result of the temperature sensor. Moreover, the conventional fixing device includes the heater, a holder supporting the heater and a heat conductive member located between the heater and the holder. In the conventional fixing device, the temperature of the heater is detected by bringing the temperature sensor into contact with the heat conductive member.

DESCRIPTION

Due to support a sheet with a maximum width usable in the fixing device, an elongated heat conductive member with a width determined in accordance with the maximum width usable in the fixing device is used in the conventional fixing device. As a result of this, in the conventional fixing device, there is a possibility that the fixing temperature in fixing operation cannot be detected with high accuracy in a case where a size of a sheet is changed.

Specifically, in the conventional fixing device, in a case where the fixing operation is executed for, for example, the sheet with the minimum width usable in the fixing device, there is a possibility that the temperature sensor disposed at an end part of the heater in a longitudinal direction of the heater detects the temperature of the end part of the heater in the longitudinal direction of the heater by being affected by a temperature of an low-temperature area of a central part of the heater in the longitudinal direction of the heater. As a result of this, in the conventional fixing device, there is a possibility that the temperature sensor cannot detect the temperature at the end part of the heater in the longitudinal direction of the heater with high accuracy.

An aspect of the disclosure relates to a fixing device and an image forming apparatus capable of detecting a fixing temperature with high accuracy regardless of sheet sizes of a sheet S1.

In one aspect of the disclosure, a fixing device includes a heater including a substrate and a resistance heating element disposed on the substrate, an endless belt configured to rotate around the heater, a holder holding the heater, a first heat conductive member and a second heat conductive member each disposed between the heater and the holder and arranged in a longitudinal direction of the heater such that a first end of the first heat conductive member and a second of the second heat conductive member in the longitudinal direction of the heater are adjacent to each other in the longitudinal direction of the heater, the first heat conductive member and the second heat conductive member being configured to conduct heat in the longitudinal direction of the heater, a temperature sensor configured to detect a temperature at an end part of the heater in the longitudinal direction of the heater. The temperature sensor is in contact with the first heat conductive member. A position located between first end of the first heat conductive member and the second end of the second heat conductive member in the longitudinal direction is closer to the temperature sensor than a central position of the resistance heating element in the longitudinal direction of the heater.

In another aspect of the disclosure, an image forming apparatus includes a fixing device. The fixing device includes a heater including a substrate and a resistance heating element disposed on the substrate, an endless belt configured to rotate around the heater, a holder holding the heater, a first heat conductive member and a second heat conductive member each disposed between the heater and the holder and arranged in a longitudinal direction of the heater such that a first end of the first heat conductive member and a second of the second heat conductive member in the longitudinal direction of the heater are adjacent to each other in the longitudinal direction of the heater, the first heat conductive member and the second heat conductive member being configured to conduct heat in the longitudinal direction of the heater, a temperature sensor configured to detect a temperature at an end part of the heater in the longitudinal direction of the heater. The temperature sensor is in contact with the first heat conductive member. A position located between first end of the first heat conductive member and the second end of the second heat conductive member in the longitudinal direction is closer to the temperature sensor than a central position of the resistance heating element in the longitudinal direction of the heater.

The objects, features, advantages, and technical and industrial significance of the present disclosure will be better understood by reading the following detailed description of the embodiments, when considered in connection with the accompanying drawings, in which.

There will be described below a first embodiment of this disclosure with reference to FIG. 1 to FIG. 6. In the present embodiment, there will be described a laser printer configured to form an image on a sheet S1 by using toner as an example of an image forming apparatus 1.

Configuration of Image Forming Apparatus

Figure 1:
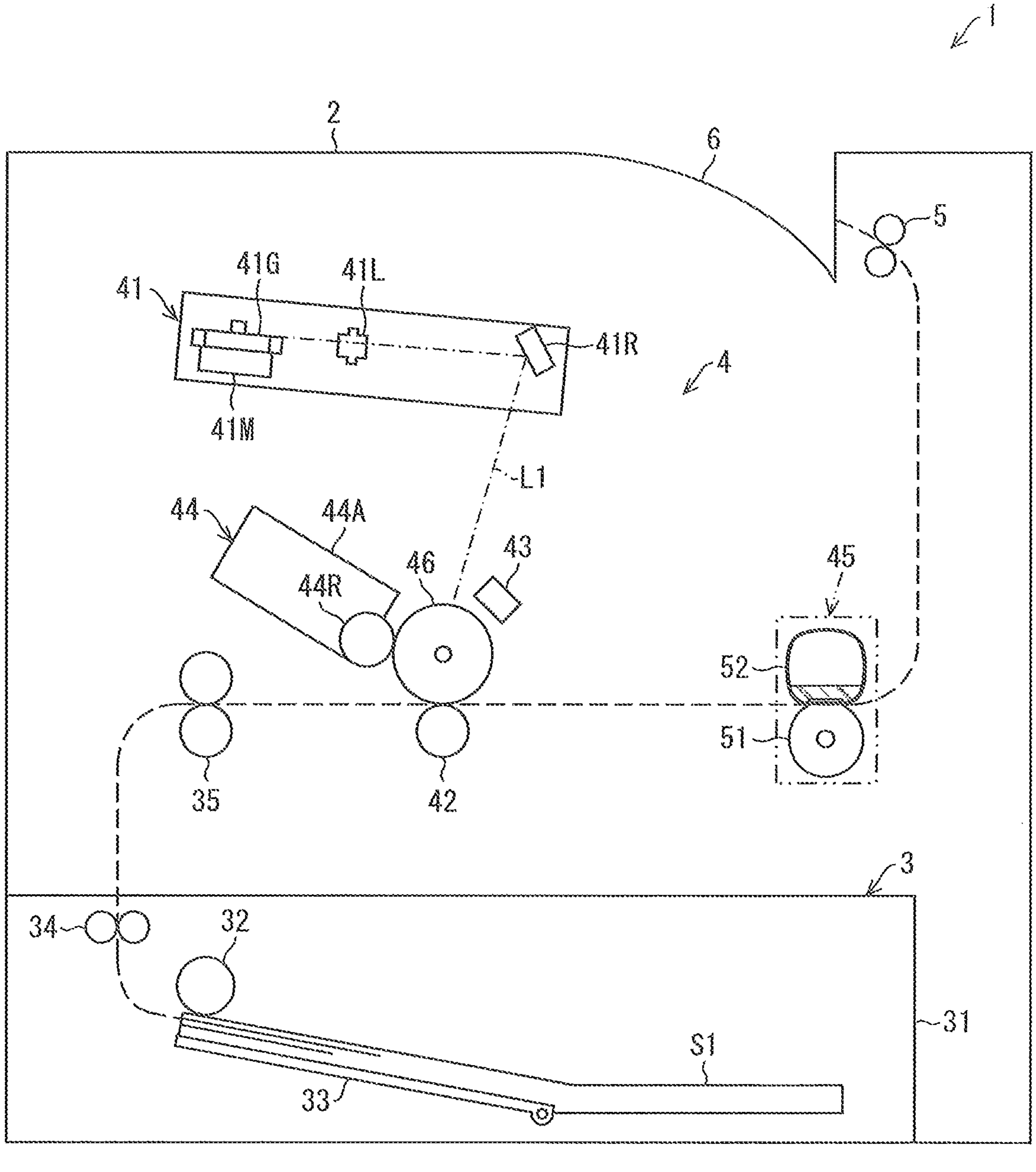
FIG. 1 is a view for explaining an overview of a configuration of an image forming apparatus of the present disclosure.

FIG. 1 is a view for explaining an overview of a configuration of the image forming apparatus 1 of the first embodiment of the present disclosure. It is noted that there will be exemplified below a monochrome printer configured to execute an image forming process of monochrome images as the image forming apparatus 1, however, the present embodiment is not limited to this. The image forming apparatus 1 may be, for example, a color printer configured to execute an image forming process of full-color images.

As illustrated in FIG. 1, the image forming apparatus 1 includes a housing 2, a sheet-supplier 3, an image forming unit 4, a discharging roller 5 and a discharge tray 6. As illustrated in FIG. 1, the housing 2 is configured as an external container of the image forming apparatus 1, and the housing 2 contains a main configuration of the image forming apparatus 1.

As illustrated in FIG. 1, the sheet-supplier 3 supplies a sheet S1. The sheet-supplier 3 includes a sheet-supply tray 31, a sheet supplying roller 32, a pressing plate 33, a conveying roller 34 and a registration roller 35. The sheet-supply tray 31 is a member shaped like a box opening upward, and the sheet-supply tray 31 accommodates a predetermined number of sheets S1. Moreover, the sheet S1 is a recording medium for which the image forming process is executed, and the sheet S1 is made of paper, plastic and so on.

The sheet supplying roller 32 conveys the sheet S1 accommodated in the sheet-supply tray 31. That is, when the sheet S1 is fed from the sheet-supply tray 31, the sheet S1 placed on the sheet-supply tray 31 is pushed toward the sheet supplying roller 32 by the pressing plate 33, and the sheet S is fed to the conveying roller 34 in accordance with rotation of the sheet supplying roller 32. The conveying roller 34 conveys the sheet S1 toward the registration roller 35. The registration roller 35 conveys the sheet S toward the image forming unit 4 after aligning positions of leading edges of the sheet S.

The image forming unit 4 forms an image on the sheet S1 fed by the sheet-supplier 3 by executing the image forming process. As illustrated in FIG. 1, the image forming unit 4 includes an exposing unit 41, a transfer unit 42, a charging unit 43, a developing unit 44, a fixing device 45 of the present disclosure and a photoconductive drum 46. The exposing unit 41 includes a laser light source, which is not illustrated, a polygon mirror 41G, a scanning lens 41L, a polygon motor 41M and a reflector 41R.

The polygon mirror 41G is a polygon mirror having a regular hexagonal prism shape, side walls of which are six reflecting surfaces. The polygon mirror 41G is for deflecting light beam L1 emitted from the laser light source to a direction directed toward the photoconductive drum 46. The polygon motor 41M rotates and drives the polygon mirror 41G by being driven by a motor driver, which is not illustrated.

The exposing unit 41 deflects the light beam L1 by the polygon mirror 41G such that the light beam L1 is emitted toward a surface of the photoconductive drum 46 via the polygon mirror 41G, the scanning lens 41L and the reflector 41R. The exposing unit 41 exposes the photoconductive drum 46 by scanning the surface of the photoconductive drum 46 by the light beam L1. As a result of this, an electrostatic latent image is formed on the photoconductive drum 46. The electrostatic latent image constitutes a toner image, which will be described below. The polygon motor 41M is, for example, a brushless DC motor.

The transfer unit 42 includes a transfer roller that cooperates with the photoconductive drum 46 to nip the sheet S1 therebetween, and the transfer unit 42 transfers the toner image from the photoconductive drum 46 to the sheet S1. The charging unit 43 includes, for example, a scorotron type charging unit having a charging wire and a grid portion, which are not illustrated. In the charging unit 43, a charging voltage generated by a high voltage generating circuit, which is not illustrated, is applied to the charging wire, and a grid voltage generated by the high voltage generating circuit is applied to the grid portion. As a result, a corona discharge occurs in the charging unit 43, and the surface of the photoconductive drum 46 is charged with uniformity. The developing unit 44 includes a developing roller 44R and a toner cartridge 44A containing developer such as toner.

It is noted that the present disclosure is not limited to the above described configuration, and the transfer unit 42 may include, for example, a transfer belt in place of the transfer roller. Moreover, the charging unit 43 may include, for example, a charging roller in place of the scorotron type charging unit.

In the image forming unit 4, after the charging unit 43 charges the surface of the photoconductive drum 46 with uniformity, the electrostatic latent image is formed on the surface of the photoconductive drum 46 by the light beam L1 from the exposing unit 41 based on printing data. Moreover, the developing roller 44R supplies toner to the surface of the photoconductive drum 46 on which the electrostatic latent image is formed from the toner cartridge 44A. As a result of this, the electrostatic latent image becomes a visible image, and the toner image is formed on the surface of the photoconductive drum 46. Then, the toner image formed on the surface of the photoconductive drum 46 is transferred to the sheet S1 when the sheet S1 supplied from the sheet-supplier 3 is conveyed to a transfer position which is a position located between the photoconductive drum 46 and the transfer unit 42.

The sheet S1 to which the toner image is transferred is conveyed to the fixing device 45 by the photoconductive drum 46 and the transfer unit 42. The fixing device 45 fixes the toner image formed on the sheet S1 onto the sheet S1. Specifically, the fixing device 45 heat-fixes the toner image formed on the sheet S1 which is conveyed from the photoconductive drum 46 and the transfer unit 42 by using heat generated by a heater 60. The sheet S1 onto which the toner image is heat-fixed is discharged to the discharge tray 6 by the discharging roller 5.

The fixing device 45 includes a pressure roller S1 configured to press the sheet S1 on which the toner image is formed and a heating unit 52 configured to heat the sheet S1 in a state in which the heating unit 52 is in contact with the sheet S1. One of the pressure roller 51 and the heating unit 52 is pressed toward the other of the pressure roller 51 and the heating unit 52 by a pressing unit, which is not illustrated. Accordingly, when the pressing unit is controlled by instructions from a controller, which is not illustrated, a fixing operation of the toner image for the sheet S1 is executed in the fixing device 45 in a state in which a predetermined pressure is applied between the pressure roller 51 and the heating unit 52.

The pressure roller S1 rotates and drives in a clockwise direction in FIG. 1 based on instructions from the controller. That is, the pressure roller S1 rotates in a state in which the pressure roller S1 cooperates with a belt 53, which will be described below, provided for the heating unit 52 to nip the sheet S1, which is conveyed toward the discharge tray 6, therebetween. In this situation, the belt 53 is configured to be driven to rotate in a predetermined rotation direction, which is a direction illustrated by an arrow R in FIG. 4, by friction force among the pressure roller S1, the belt 53 and the sheet S1. As a result of this, in the fixing device 45, the toner image is heat-fixed onto the sheet S1 when the sheet S1 on which the toner image is transferred is conveyed to a position between the pressure roller 51 and the heating unit 52.

Configuration of Heating Unit

Figure 2A:
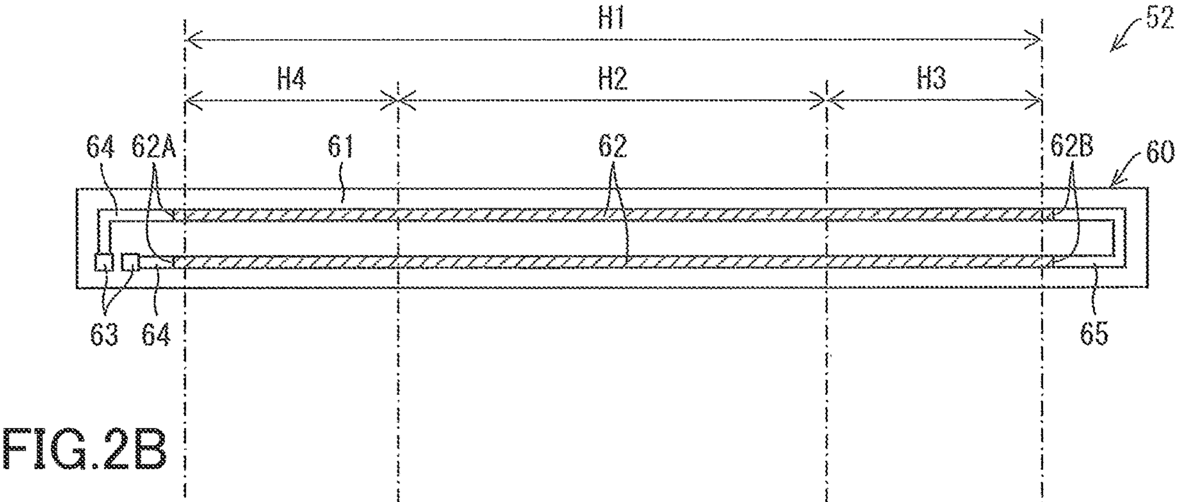
FIG. 2A is a plan view illustrating a heater of a heating unit provided for a fixing device of the present disclosure.
Figure 2B:
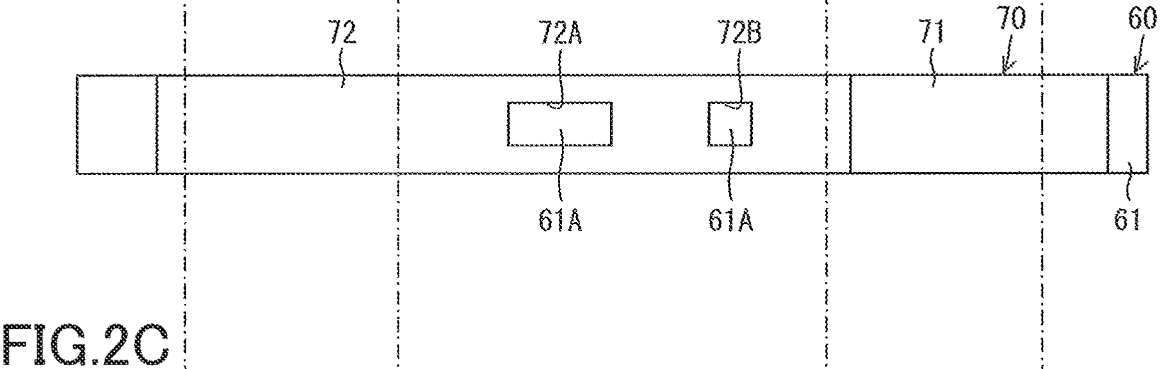
FIG. 2B is a plan view illustrating a heat conductive member of the heating unit.
Figure 2C:
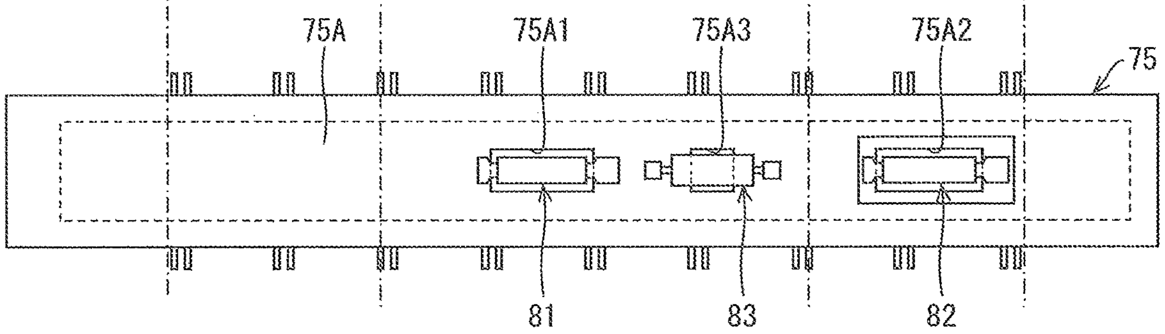
FIG. 2C is a plan view illustrating a first temperature sensor, a second temperature sensor and an thermostat of the heating unit.
Figure 3A:
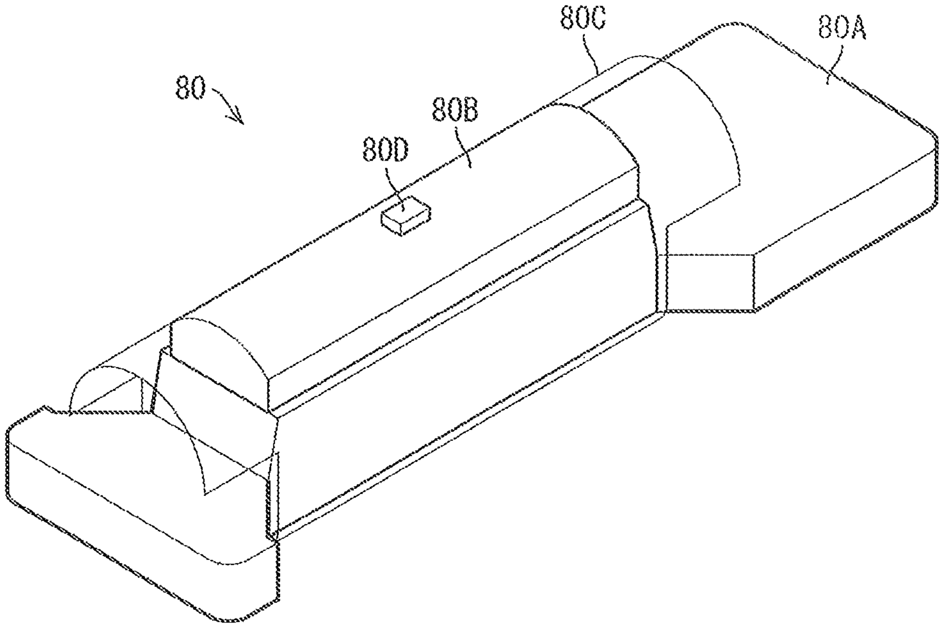
FIG. 3A is a perspective view illustrating the first temperature sensor and the second temperature sensor.
Figure 3B:
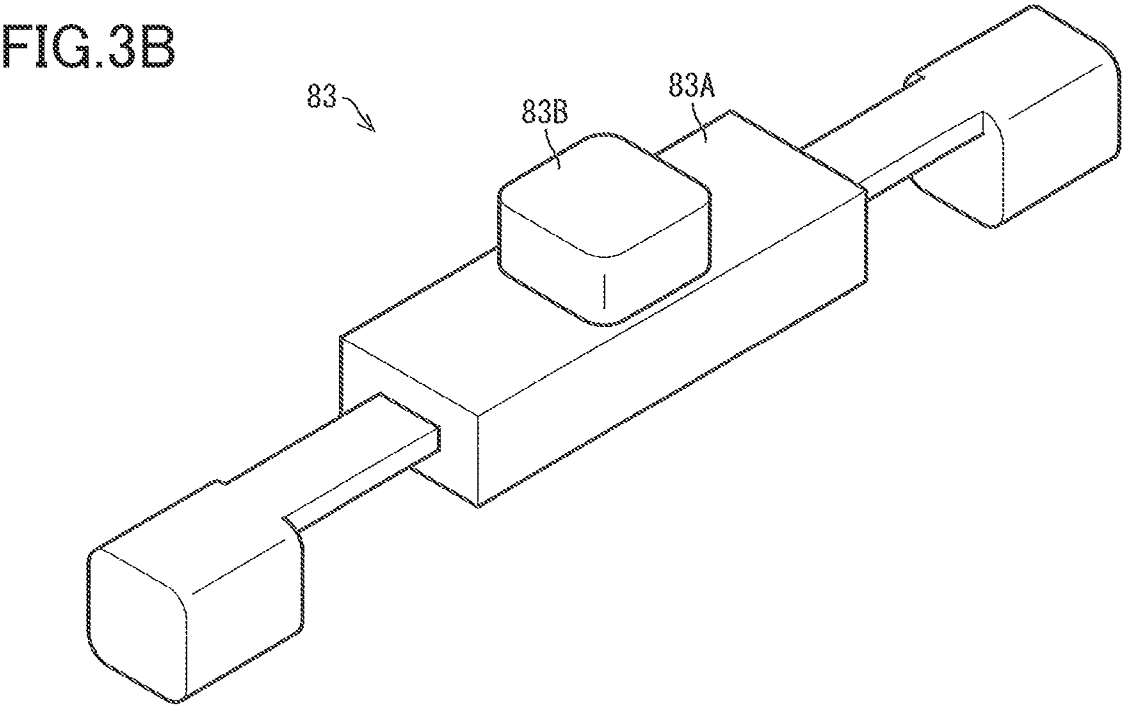
FIG. 3B is a perspective view illustrating the thermostat.
Figure 4:
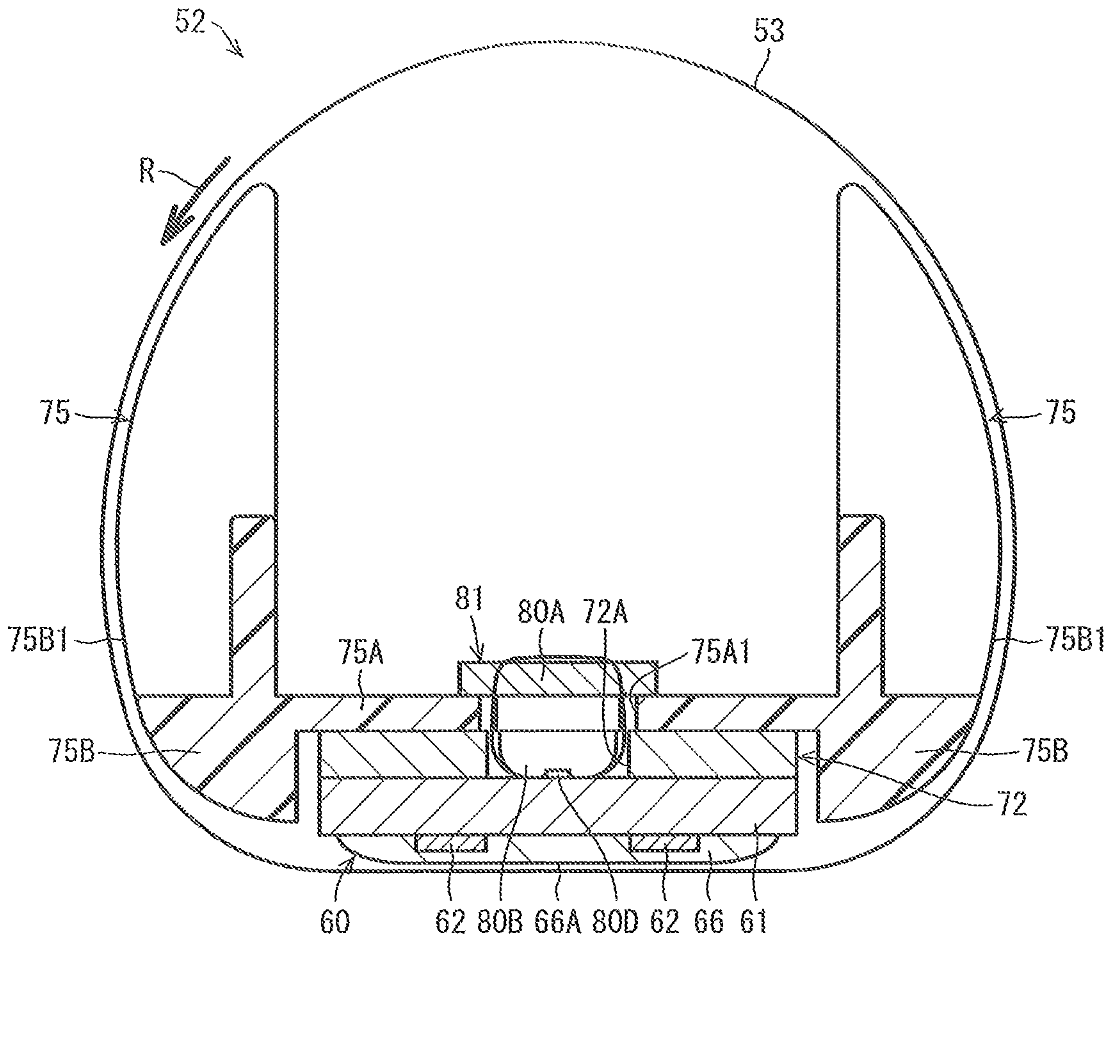
FIG. 4 is a cross sectional view illustrating the first temperature sensor of the heating unit.
Figure 5:
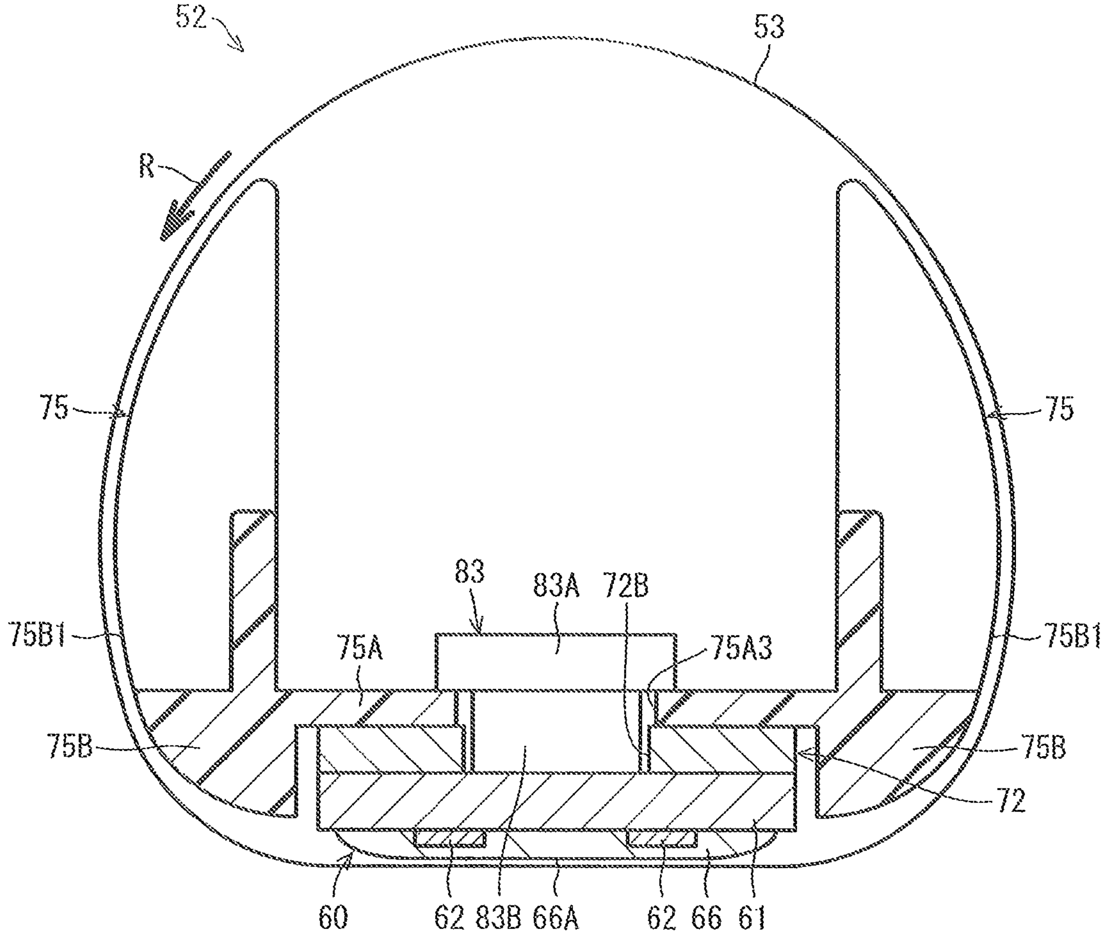
FIG. 5 is a cross sectional view illustrating the thermostat of the heating unit.
Figure 6:
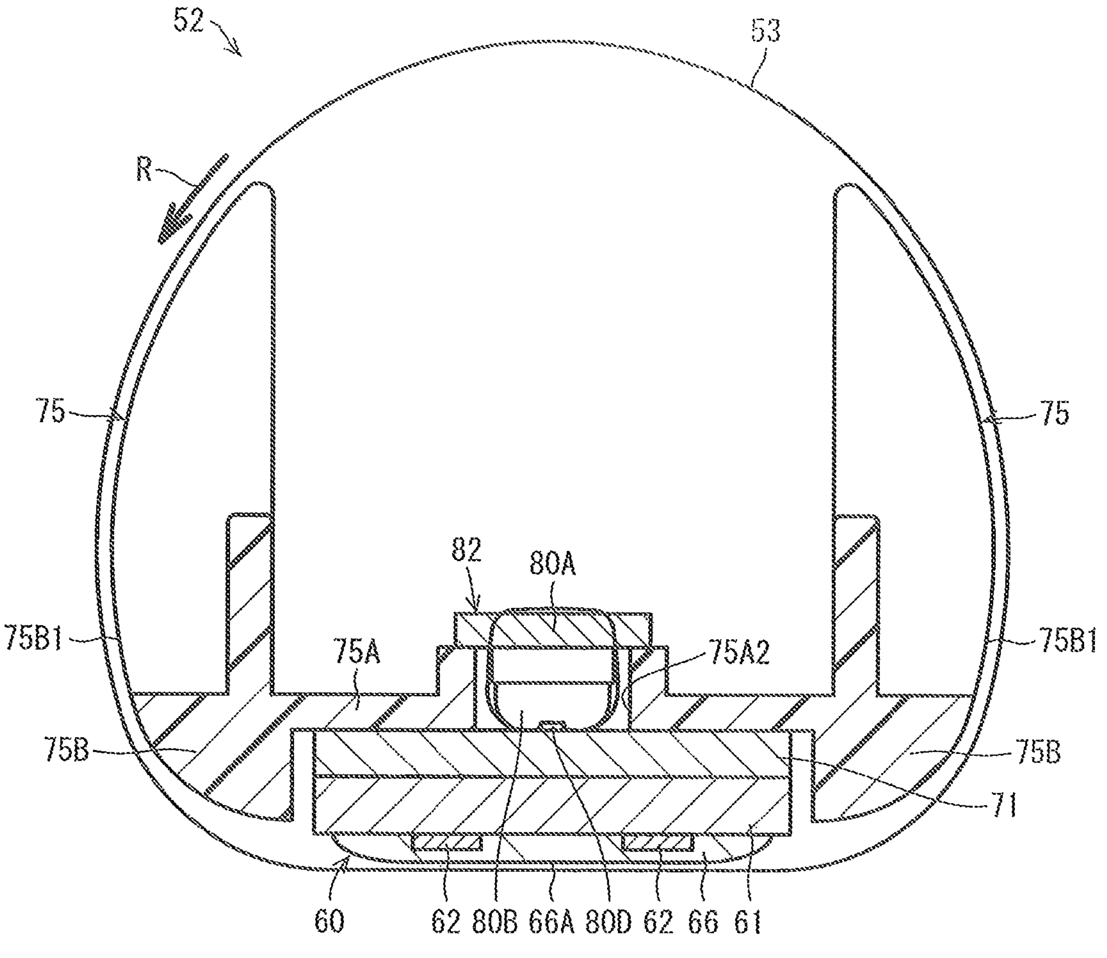
FIG. 6 is a cross sectional view illustrating the second temperature sensor of the heating unit.

Here, there will be specifically described the heating unit 52 of the present embodiment with reference to FIG. 2A to FIG. 6. FIG. 2A is a plan view illustrating the heater 60 of the heating unit 52 provided for the fixing device 45 of the present disclosure. FIG. 2B is a plan view illustrating a heat conductive member 70 of the heating unit 52, and FIG. 2C is a plan view illustrating a first temperature sensor 81, a second temperature sensor 82 and a thermostat 83 of the heating unit 52. FIG. 3A is a perspective view illustrating the first temperature sensor 81 and the second temperature sensor 82, and FIG. 3B is a perspective view illustrating the thermostat 83. FIG. 4 is a cross sectional view illustrating the first temperature sensor 81 of the heating unit 52. FIG. 5 is a cross sectional view illustrating the thermostat 83 of the heating unit 52. FIG. 6 is a cross sectional view illustrating the second temperature sensor 82 of the heating unit 52.

As illustrated in FIG. 2A to FIG. 2C, the heating unit 52 of the present embodiment includes the heater 60, a holder 75 supporting the heater 60 and the heat conductive member 70 disposed between the heater 60 and the holder 75. The heater 60 a heat-applying member having a rectangular shape in plan view, and the heater 60 includes a substrate 61 and resistance heating elements 62 disposed on the substrate 61. The number of the resistance heating elements 62 is two, for example.

The substrate 61 is made of, for example, ceramic material. The two resistance heating elements 62 are formed on a first surface of the substrate 61 by, for example, a printing patterning method such that the two resistance heating elements 62 are parallel to each other. It is noted that the present disclosure is not limited to the above described configuration, and the substrate 61 may be made of metallic material such as stainless. In this case, the two resistance heating elements 62 are formed on the first surface of the substrate 61 in a state in which an insulating layer which is made of such as glass material is interposed between the two resistance heating elements 62 and the first surface of the substrate 61.

The resistance heating element 62 is made of, for example, electrically conductive material having high heat build-up property such as nickel-chrome alloy and iron-chrome alloy, for example. Moreover, a current-supply terminal 63 is connected to a first end 62A of the resistance heating element 62 via a conducting wire 64. Moreover, a conducting wire 65 is connected to a second end 62B of the resistance heating element 62, and the two resistance heating elements 62 are electrically conducting to each other via the conducting wire 65.

A connector, which is not illustrated, is connected to the current-supply terminal 63 attachably and detachably. Electric power is supplied to the resistance heating element 62 in a state in which a power source, which is not illustrated, is connected to the current-supply terminal 63 via the connector. Then, in the heater 60, the resistance heating element 62 is configured to generate heat based on an instruction from the controller. That is, an amount of current supplied to the resistance heating element 62 is controlled, moreover, the amount of heat generated by the resistance heating element 62 is increased and decreased, and the heat-applying from the heater 60 to the belt 53 is controlled.

Moreover, as illustrated in FIG. 2A, in the heater 60, a dimension of the resistance heating element 62 in a longitudinal direction of the heater 60 is greater than a maximum width H1 of the sheet S1 usable in the fixing device 45. Moreover, the fixing device 45 is configured such that toner images can be heat-fixed on a plurality of kinds of the sheets S respectively having various width dimensions. Specifically, the fixing operation is executed in the fixing device 45 in a state in which center positions in width directions of the plurality of kinds of the sheets S1 respectively having the various width dimensions are aligned with each other. For example, the sheet S1 having a minimum width H2 usable in the fixing device 45 is heated by a central part of the resistance heating element 62 in the longitudinal direction of the heater 60 in the fixing operation.

Moreover, in the fixing device 45, when the fixing operation is executed for the sheet S1 having the minimum width H2, an end area H3 and an end area H4 which are disposed at positions located outside the area of the minimum width H2 in the longitudinal direction of the heater 60 are not-passing-areas through which the sheet S1 having the minimum width H2 does not pass in the fixing operation. As a result of this, the heat in the end area H3 and the end area H4 is not lost by the sheet S1 having the minimum width H2 in the fixing operation, and the temperature of the heater 60 at the end area H3 or the end area H4 easily increases, when compared with the central part of the resistance heating element 62 in the longitudinal direction of the heater 60, that is the area of the minimum width H2.

Moreover, as illustrated in FIG. 5, the heater 60 includes a cover 66 disposed on the substrate 61 so as to cover the resistance heating element 62. The cover 66 is made of insulating material such as glass material, for example. Moreover, the cover 66 includes a nip surface 66A that is in contact with an inner circumferential surface of the belt 53.

The belt 53 is an endless belt having flexibility and a heat-resisting property. The belt 53 includes, for example, a base portion made of metallic material such as stainless, and an insulating layer made of synthetic resin such as fluoro-resin and configured to cover the base portion, which are not illustrated. The belt 53 is configured to rotate around the heater 60, the heat conductive member 70, the holder 75, the first temperature sensor 81, the second temperature sensor 82 and the thermostat 83 in a state in which the heater 60, the heat conductive member 70, the holder 75, the first temperature sensor 81, the second temperature sensor 82 and the thermostat 83 are located on an inner side of the belt 53.

Figure 8A:
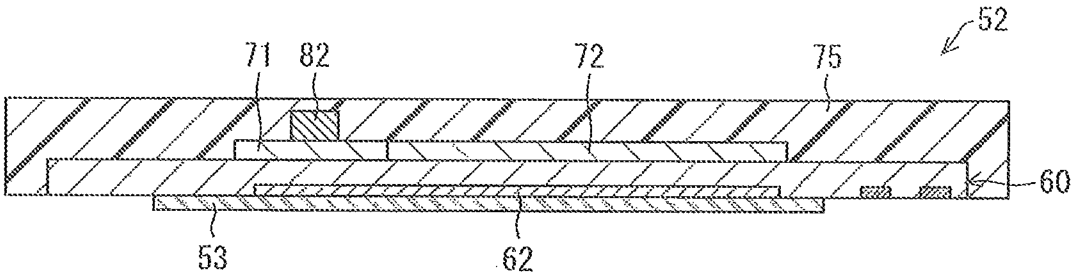
FIG. 8A is a side view illustrating a main configuration of the heating unit of the present disclosure.

Moreover, the inner circumferential surface of the belt 53 is in contact with the nip surface 66A of the heater 60, and the belt 53 is configured such that heat from the heater 60 is transferred to the sheet S1 via the belt 53. Moreover, as illustrated in FIG. 8A, a dimension of the longitudinal direction of the heater 60 is greater than a dimension of the resistance heating element 62 in the longitudinal direction of the heater 60.

The holder 75 is made of synthetic resin material, for example. Moreover, as illustrated in FIG. 2C, the holder 75 includes a support portion 75A supporting the heater 60. That is, the support portion 75A supports the substrate 61 of the heater 60 illustrated by a dotted line in FIG. 2C via the heat conductive member 70 in a state in which the support portion 75A is in contact with the heat conductive member 70. Moreover, as illustrated in FIG. 5, the holder 75 includes a guide portion 75B having a guide surface 75B1 that is in contact with the inner circumferential surface of the belt 53 and configured to guide the belt 53.

The heat conductive member 70 is made of metallic material, the thermal conductivity of which is high, such as aluminum, aluminum alloy, and copper. The heat conductive member 70 functions as a heat soaking plate configured to conduct heat in the longitudinal direction of the heater 60 so as to make the temperature of the heater 60 uniform in the longitudinal direction of the heater 60. It is noted that an anisotropic heat conductive member such as a graphite sheet may be used to constitute the heat conductive member 70. In a case where the anisotropic heat conductive member is used as the heat conductive member 70, it is preferable that the heat conductivity of the anisotropic heat conductive member in a longitudinal direction of the anisotropic heat conductive member is greater than the heat conductivity in a thickness direction of the anisotropic heat conductive member.

Moreover, as illustrated in FIG. 2B, the heat conductive member 70 includes a first heat conductive member 71 and a second heat conductive member 72. The first heat conductive member 71 and the second heat conductive member 72 are arranged in the longitudinal direction of the heater 60 such that a first end of the first heat conductive member 71 and a second end of the second heat conductive member 72 are adjacent to each other in the longitudinal direction of the heater 60. The first end of the first heat conductive member 71 is an end of the first heat conductive member 71 closer to the second heat conductive member 72 than a second end of the first heat conductive member 71. Moreover, the second end of the second heat conductive member 72 is an end of the second heat conductive member 72 closer to the first heat conductive member 71 than a first end of the second heat conductive member 72. Here, a situation in which the first end of the first heat conductive member 71 and the second end of the second heat conductive member 72 are adjacent to each other includes a situation in which the first end of the first heat conductive member 71 and the second end of the second heat conductive member 72 are in contact with each other in the longitudinal direction of the heater 60, and a situation in which the first end of the first heat conductive member 71 and the second end of the second heat conductive member 72 are apart from each other with a predetermined space in the longitudinal direction of the heater 60.

Moreover, as illustrated in FIG. 2B, the first heat conductive member 71 is disposed at a second end part of the heater 60. The first heat conductive member 71 extends in the longitudinal direction of the heater 60 such that the first heat conductive member 71 approximately includes a whole of the end area H3 in the longitudinal direction of the heater 60. Moreover, as described below, the second temperature sensor 82, which is a temperature sensor configured to detect a temperature of the second end part of the heater 60 in the longitudinal direction of the heater 60, is in direct contact with the first heat conductive member 71.

Moreover, as illustrated in FIG. 2B, the second heat conductive member 72 is disposed at an area extending from the central part of the heater 60 to a first end part of the heater 60 in the longitudinal direction of the heater 60. The second heat conductive member 72 extends in the longitudinal direction of the heater 60 such that the second heat conductive member 72 includes a whole of an area of the minimum width H2 and the end area H4 in the longitudinal direction of the heater 60. Moreover, as described below, an opening 72A and an opening 72B are formed at a part of the second heat conductive member 72 which corresponds to the central part of the heater 60 in the longitudinal direction of the heater 60, and the first temperature sensor 81 is in direct contact with a back surface 61A of the substrate 61 through the opening 72A, and the thermostat 83 is in direct contact with the back surface 61A of the substrate 61 through the opening 72B.

Moreover, as illustrated in FIG. 2B, the first heat conductive member 71 and the second heat conductive member 72 are disposed such that a position located between the first end of the first heat conductive member 71 and the second end of the second heat conductive member 72 is closer to the second temperature sensor 82 than a central position of the resistance heating element 62 in the longitudinal direction of the heater 60. Specifically, as illustrated in FIG. 2B, the position located between the first end of the first heat conductive member 71 and the second end of the second heat conductive member 72 is located within the end area H3 in the longitudinal direction of the heater 60. In other words, the first end of the first heat conductive member 71 in the longitudinal direction of the heater 60 is located at a position closer to the second temperature sensor 82 than the central position of the resistance heating element 62 in the longitudinal direction of the heater 60. Further, the second end of the second heat conductive member 72 in the longitudinal direction of the heater 60 is located at a position closer to the second temperature sensor 82 than the central position of the resistance heating element 62 in the longitudinal direction of the heater 60.

Each of the first temperature sensor 81 and the second temperature sensor 82 is constituted by a thermistor, for example. It is noted that the first temperature sensor 81 and the second temperature sensor 82 are collectively called a temperature sensor 80 in the following description.

As illustrated in FIG. 3A, the temperature sensor 80 includes a base portion 80A, a protruding member 80B on which a temperature detecting element 80D is provided such that the temperature detecting element 80D protrudes upward, and a film 80C provided for the base portion 80A so as to cover the protruding member 80B. The protruding member 80B is made of, for example, elastic material such as sponge material, and the protruding member 80B is mounted on the base portion 80A. The temperature sensor 80 can accurately detect a temperature of a target to be detected by pressing the temperature detecting element 80D by the protruding member 80B in a state in which the temperature detecting element 80D is in certain contact with the target to be detected.

As illustrated in FIG. 2C, the first temperature sensor 81 81 is provided for the holder 75 such that the first temperature sensor 81 is located at a position within an area of the minimum width H2, and the first temperature sensor 81 detects a temperature at the central part of the heater 60 in the longitudinal direction of the heater 60. Specifically, as illustrated in FIG. 4, the first temperature sensor 81 detects the temperature at the central part of the heater 60 in the longitudinal direction of the heater 60 in a state in which the protruding member 80B passes through an opening 75A1 of the holder 75 and the opening 72A of the second heat conductive member 72 in this order such that the temperature detecting element 80D comes into contact with the back surface 61A of the substrate 61. Moreover, the first temperature sensor 81 is connected to the controller, and the controller executes a feedback control of the heater 60 by using a detected result of the first temperature sensor 81.

It is noted that the present disclosure is not limited to the above described configuration, and the first temperature sensor 81 may be in contact with the second heat conductive member 72 by bringing the protruding member 80B into contact with the back surface of the second heat conductive member 72 without forming the opening 75A1 of the holder 75 and the opening 72A of the second heat conductive member 72.

As illustrated in FIG. 2C, the second temperature sensor 82 is provided for the holder 75 such that the second temperature sensor 82 is located within the end area H3 and at an end part of the resistance heating element 62 in the longitudinal direction of the heater 60. The second temperature sensor 82 detects a temperature at the second end part of the heater 60, which is closer to the second end of the substrate 61 than the first temperature sensor 81, in the longitudinal direction of the heater 60. Specifically, as illustrated in FIG. 6, the second temperature sensor 82 detects the temperature at the second end part of the heater 60 in the longitudinal direction of the heater 60 in a state in which the protruding member 80B passes through an opening 75A2 of the holder 75 such that the temperature detecting element 80D comes into contact with a back surface of the first heat conductive member 71. Moreover, the second temperature sensor 82 is connected to the controller, and the controller determines a degree of increase in temperature at the second end part of the heater 60 in the longitudinal direction of the heater 60 by using a detected result of the second temperature sensor 82.

The thermostat 83 interrupts energization to the resistance heating element 62 when the heater 60 is abnormally increased in temperature. Specifically, as illustrated in FIG. 3B, the thermostat 83 is constituted by, for example, a thermostat, and the thermostat 83 includes a container 83A and a temperature detecting portion 83B protruding upward from the container 83A and configured to detect a temperature. An interrupting mechanism using, for example, a bimetal, which is not illustrated, connected to the temperature detecting portion 83B is provided for the container 83A. The thermostat 83 interrupts energization to the resistance heating element 62, that is supply of electric power to the resistance heating element 62, when the temperature of the heater 60 increases to a temperature equal to or greater than a predetermined temperature.

Moreover, as illustrated in FIG. 2C, the thermostat 83 is provided for the holder 75 such that the thermostat 83 is located at a position within an area of the minimum width H2. The thermostat 83 detects a temperature at the central part of the heater 60 in the longitudinal direction of the heater 60. Specifically, as illustrated in FIG. 5, the thermostat 83 detects the temperature at the central part of the heater 60 in the longitudinal direction of the heater 60 in a state in which the temperature detecting portion 83B passes through an opening 75A3 of the holder 75 and the opening 72B of the second heat conductive member 72 in this order such that the temperature detecting portion 83B comes into contact with the back surface 61A of the substrate 61.

As described above, the fixing device 45, and the image forming apparatus 1 including the fixing device 45 according to the present embodiment includes the heater 60 having the resistance heating element 62, the holder 75 supporting the heater 60, the heat conductive member 70 disposed between the heater 60 and the holder 75, the second temperature sensor 82 configured to detect the temperature at the second end part of the heater 60 in the longitudinal direction of the heater 60. The heat conductive member 70 includes the first heat conductive member 71 and the second heat conductive member 72. The first heat conductive member 71 and the second heat conductive member 72 are arranged such that the first end of the first heat conductive member 71 and the second end of the second heat conductive member 72 are adjacent to each other in the longitudinal direction of the heater 60. The second temperature sensor 82 is in contact with the first heat conductive member 71. The position located between the first end of the first heat conductive member 71 and the second end of the second heat conductive member 72 is located at the position closer to the second temperature sensor 82 than the central position of the resistance heating element 62 in the longitudinal direction of the heater 60. As a result of this, in the present embodiment, when the fixing operation is executed for the sheet S1 having the minimum width H2 usable in the fixing device 45, the second temperature sensor 82 can detect the temperature of the second end part of the heater 60 in the longitudinal direction of the heater 60 by reducing being affected by a temperature of an low-temperature area of the central part of the heater 60 in the longitudinal direction of the heater 60, different from a case where the heat conductive member 70 does not include a position located between the first end of the first heat conductive member 71 and the second end of the second heat conductive member 72. Accordingly, in the present embodiment, it is possible to configure the fixing device 45 and the image forming apparatus 1 capable of detecting the fixing temperature with high accuracy regardless of sheet sizes of the sheet S1.

Moreover, in the present embodiment, since the second temperature sensor 82 is disposed at the second end part of the resistance heating element 62 in the longitudinal direction of the heater 60, the second temperature sensor 82 can detect the temperature at the second end part of the resistance heating element 62 in the longitudinal direction of the heater 60 where the temperature at which increases more easily than the temperature at the central part of the resistance heating element 62 in the longitudinal direction of the heater 60. Accordingly, it is possible to certainly improve a degree of detecting accuracy of the fixing temperature.

Figure 7A:
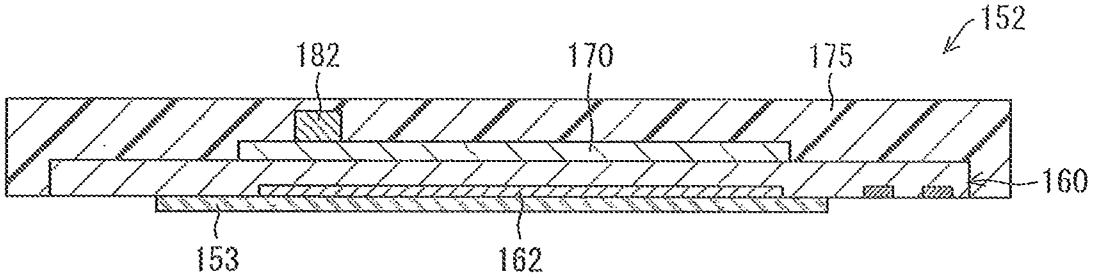
FIG. 7A is a side view illustrating a main configuration of a heating unit of a comparative example.
Figure 7B:
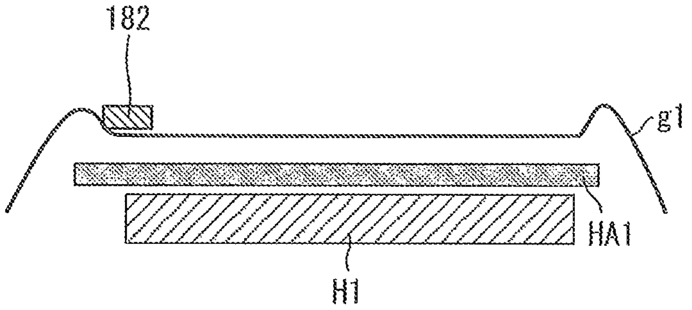
FIG. 7B is a view for explaining a temperature distribution in a fixing operation for a sheet with a maximum width of the comparative example.
Figure 7C:
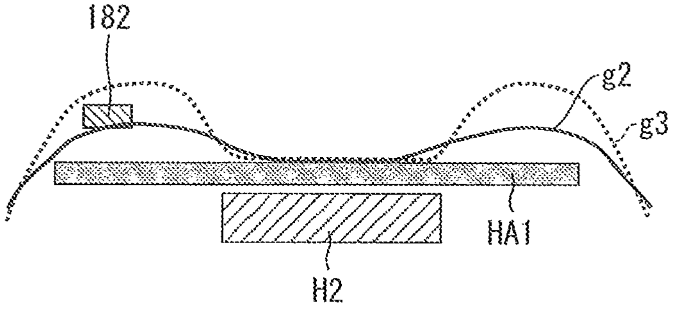
FIG. 7C is a view for explaining a temperature distribution in a fixing operation for a sheet with a minimum width of the comparative example.
Figure 8B:
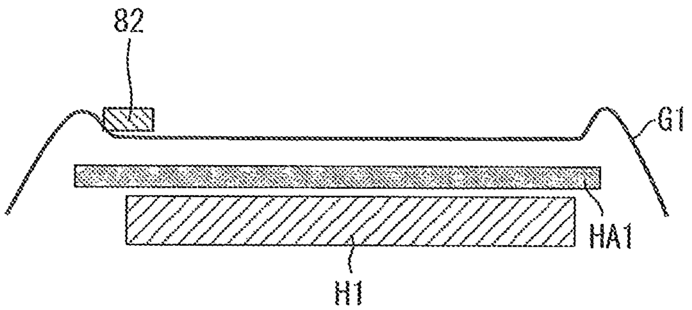
FIG. 8B is a view for explaining a temperature distribution in the fixing operation for the sheet with the maximum width in the present disclosure.
Figure 8C:
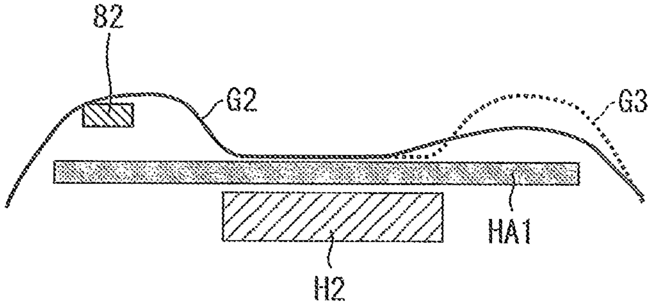
FIG. 8C is a view for explaining a temperature distribution in the fixing operation for the sheet with the minimum width in the present disclosure.
Figure 8D:
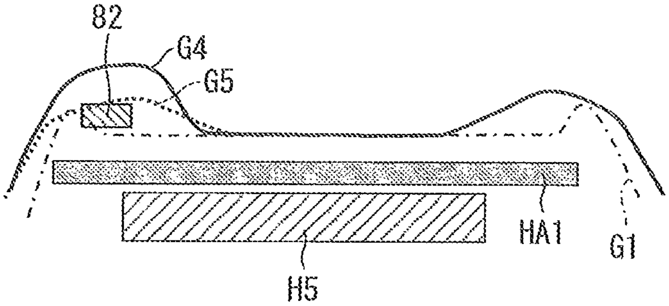
FIG. 8D is a view for explaining a temperature distribution in the fixing operation for a sheet with an intermediate width in the present disclosure.

Here, there will be described effects of the fixing device 45 and the image forming apparatus 1 according to the present embodiment with reference to FIG. 7A to FIG. 8C. FIG. 7A is a side view illustrating a main configuration of a heating unit of a comparative example, FIG. 7B is a view for explaining a temperature distribution in the fixing operation for a sheet with the maximum width in the comparative example, and FIG. 7C is a view for explaining a temperature distribution in the fixing operation for the sheet with the minimum width in the comparative example. FIG. 8A is a side view illustrating a main configuration of the heating unit of the first embodiment, FIG. 8B is a view for explaining a temperature distribution in the fixing operation for the sheet S1 with the maximum width in the first embodiment, and FIG. 8C is a view for explaining a temperature distribution in the fixing operation for the sheet S1 with the minimum width in the first embodiment. FIG. 8D is a view for explaining a temperature distribution in the fixing operation for a sheet with an intermediate width of the first embodiment.

As illustrated in FIG. 7A, in the comparative example, a heating unit 152 includes a heater 160 having a resistance heating element 162, a holder 175, a belt 153, a single heat conductive member 170, and a temperature sensor 182 configured to detect a temperature at a second end part of the heater 160 in a longitudinal direction of the heater 160 in a state in which the temperature sensor 182 is in contact with the heat conductive member 170.

In the comparative example, as illustrated in FIG. 7B, in a case where the fixing operation is executed for the sheet S1 with the maximum width H1 usable in the heating unit 152, a dimension of the sheet S1 with the maximum width H1 in the longitudinal direction of the heater 160 is slightly less than a dimension of a heat-generating area HA1 of the resistance heating element 162 in the longitudinal direction of the heater 160. As a result of this, temperatures of the heater 160 at not-passing-areas which are located outside the area of the maximum width H1 are increased. Then, as illustrated in FIG. 7B, the temperature sensor 182 detects the temperature of one of end parts of the heat-generating area HA1 of the resistance heating element 162 which is a temperature slightly increased from a temperature at a central part of the heat-generating-area HA1 in the longitudinal direction of the heater 160. As illustrated in FIG. 7B, it is noted that a graph indicating a temperature distribution of the heater 160 is represented by a waveform g1. The graph of the waveform g1 represents a relationship between positions of the heater 160 in the longitudinal direction of the heater 160 and temperatures of the heater 160. In FIG. 7B, the upper position on the waveform g1 represents a higher temperature than the lower position on the waveform g1. Above described relationship and explanations regarding the graph of the waveform g1 are applied to graphs of waveforms.

Moreover, in the comparative example, as illustrated in FIG. 7C, in a case where the fixing operation is executed for the sheet S1 with the minimum width H2 usable in the heating unit 152, the dimension of the sheet S1 with the minimum width H2 in the longitudinal direction of the heater 160 is less than the dimension of the maximum width H1 in the longitudinal direction of the heater 160 with respect to the heat-generating-area HA1 of the resistance heating element 162. In this case, each of dimensions of not-passing areas which are located outside the area of the minimum width H2 in the longitudinal direction of the heater 160 is larger than each of dimensions of the not-passing-areas outside the area of the maximum width H1 in the longitudinal direction of the heater 160. Accordingly, as illustrated in FIG. 7C, temperatures of the heater 160 at the not-passing-areas outside the area of the minimum width H2 are relatively greatly increased.

As illustrated in FIG. 7C, in the comparative example, however, the temperatures of the heater 160 at the not-passing-areas outside the area of the minimum width H2 and the temperature at the central part of the heater 160, the temperature of which is a relatively low temperature, are uniformed with each other by the heat conductive member 170. Accordingly, as indicated by the graph of a waveform g2, a degree of increase of the temperature distribution of the heater 160 at the not-passing-areas located outside the area of the minimum width H2 is reduced, when compared with the graph of a waveform g3 indicating the temperature distribution in a case where the heat conductive member 170 is not provided. That is, the temperatures at the not-passing-areas outside the area of the minimum width H2 is less increased than the case where the heat conductive member 170 is not provided. Then, as illustrated in FIG. 7C, the temperature sensor 182 detects the temperature at the second end part of the heater 160 which is decreased by the temperature at the central part of the heater 160 in the longitudinal direction of the heater 60.

As described above, in the comparative example, in the case where the fixing operation is executed for the sheet S1 with the minimum width H2, the temperature sensor 182 detects the temperature which is lower than an actual temperature at a second end part of the sheet S1, as the temperature at the second end part of the heater 160. As a result of this, in the comparative example, it is hard to detect the temperature of the sheet S1 with high accuracy in the case where the fixing operation is executed for the sheet S1 with the minimum width H2.

On the other hand, in the present embodiment, as illustrated in FIG. 8A, the heating unit 52 includes the heater 60 having the resistance heating element 62, the holder 75, the belt 53, the first heat conductive member 71, the second heat conductive member 72, and the second temperature sensor 82 configured to detect the temperature at the second end part of the heater 60 in the longitudinal direction of the heater 60 in the state in which the second temperature sensor 82 is in contact with the second heat conductive member 71.

As illustrated in FIG. 8B, in the present embodiment, in the case where the fixing operation is executed for the sheet S1 with the maximum width H1 usable in the heating unit 52, the dimension of the sheet S1 with the maximum width H1 in the longitudinal direction of the heater 60 is slightly less than a dimension of the heat-generating area HA1 of the resistance heating element 62 in the longitudinal direction of the heater 60. As a result of this, the temperatures of the heater 60 at the not-passing-areas which are located outside the area of the maximum width H1 are increased. Since the temperatures of the heater 60 at the not-passing-areas which are located outside the maximum width H1 and the temperature at the central part of the heater 60, which is a relatively low temperature area, are uniformed with each other by the first heat conductive member 71 and the second heat conductive member 72, the temperature distribution of the heater 60 is shown by a waveform G1.

Then, as illustrated in FIG. 8B, it is possible to accurately detect, by the second temperature sensor 82, the temperature which is slightly increased from the temperature at the central part of the heater 60 in the longitudinal direction of the heater 60 as the temperature of the heater 60 at the second end part of the heater 60.

Moreover, in the present embodiment, as illustrated in FIG. 8C, in the case where the fixing operation is executed for the sheet S1 with the minimum width H2 usable in the heating unit 52, the dimension of the sheet S1 with the minimum width H2 in the longitudinal direction of the heater 60 is less than the dimension of the maximum width H1 in the longitudinal direction of the heater 60 with respect to the heat-generating area HA1 of the resistance heating element 62. As a result of this, each of the dimensions of not-passing areas which are located outside the area of the minimum width H2 is larger than each of the dimensions of the not-passing-areas located outside the area of the maximum width H1 in the longitudinal direction of the heater 60, and, as illustrated in FIG. 8C, temperatures of the heater 60 at the end parts of the heater 60 are relatively greatly increased.

In the present embodiment, however, the heat conductive member 70 is divided into the first heat conductive member 71 and the second heat conductive member 72 in the longitudinal direction of the heater 60. The first heat conductive member 71 and the second heat conductive member 72 are arranged such that the first end of the first heat conductive member 71 and the second end of the second heat conductive member 72 are adjacent to each other in the longitudinal direction of the heater 60. Moreover, in the present embodiment, the position located between the first heat conductive member 71 and the second heat conductive member 72 is located at the position closer to the second temperature sensor 82 than the central position of the resistance heating element 62 in the longitudinal direction of the heater 60.

As a result of this, in the present embodiment, the temperature at the second end part of the heater 60 in the longitudinal direction of the heater 60 is not so affected by the temperature at the central part of the heater 60, which is the relatively low temperature area, in the longitudinal direction of the heater 60, different from the comparative example. The temperature distribution of the heater 60 is shown by a waveform G2. Accordingly, as illustrated in FIG. 8C, the second temperature sensor 82 can accurately detect the temperature at the second end part of the heater 60 in the longitudinal direction of the heater 60. It is noted that the temperature distribution of the heater 60 in a case where the first heat conductive member 71 and the second heat conductive member 72 are not provided is shown by a waveform G3. In this case, since the temperature at the one end area H4, which corresponds to the second end part of the heater 60 in the longitudinal direction of the heater 60, do not uniform with the temperature at the central part of the heater 60 in the longitudinal direction of the heater 60, the temperature at the one end area H4 is increased.

Moreover, as illustrated in FIG. 8D, in the present embodiment, in a case where the fixing operation is executed for a sheet S1 with an intermediate width H5, which is greater than the minimum width H2 and less than the maximum width H1, a dimension of the sheet S1 with the intermediate width H5 in the longitudinal direction of the heater 60 is slightly smaller than the dimension of the sheet S1 with the maximum with H1 in the longitudinal direction of the heater 60 with respect to the heat-generating area HA1 by the resistance heating element 62 in the heating unit 52. As a result of this, dimensions of the not-passing-areas located outside the sheet S1 with the intermediate width H5 become relatively smaller than the dimensions of the not-passing-areas located outside the sheet S1 with the minimum width H2, and the temperatures of the second end parts of the heater 60 is increased by a relatively small degree.

In the present embodiment, however, as described above, the temperature of the heater 60 at the second end part of the heater 60 in the longitudinal direction of the heater 60 is not so affected by the relatively low temperature area located at the central part of the heater 60 in the longitudinal direction of the heater 60, as similar to the case of the sheet S1 with the minimum width H2, due to the first heat conductive member 71. In this case, the temperature distribution of the heater 60 in the fixing operation for the sheet S1 with the intermediate width H5 is shown by a waveform G4. Accordingly, as illustrated in FIG. 8D, the second temperature sensor 82 can accurately detect the temperature at the second end part of the heater 60 in the longitudinal direction of the heater 60.

It is noted that, as similar to the comparative example, in a case where a single heat conductive member, which is not divided into two members, is used in place of the first heat conductive member 71 and the second heat conductive member 72, the temperatures of the heater 60 at the not-passing-areas which are located outside the sheet S1 with the intermediate width H5 is affected by the relatively low temperature area at the central part of the heater 60 in the longitudinal direction of the heater 60 in the fixing operation for the sheet S1 with the intermediate width H5. In this case, the temperature distribution of the heater 60 is shown by a waveform G5.

As described above, in the present embodiment, the second temperature sensor 82 can accurately detect the temperature of the second end part of the heater 60 in the longitudinal direction of the heater 60 in the fixing operation, regardless of sheet sizes of the sheet S1.

Moreover, as illustrated in FIG. 8D, in the present embodiment, the position located between the first heat conductive member 71 and the second heat conductive member 72 is set to a position located within the end area H3, located outside ends of the sheet S1 with the minimum width H2 in the width direction of the sheet S1 and inside ends of the sheet S1 with the intermediate width H5 in the width direction of the sheet S1. As a result of this, in the present embodiment, in the case where the fixing operation is executed for the sheet S1 with the minimum width H2, the temperature of the first heat conductive member 71 easily increases. Accordingly, the second temperature sensor 82 can accurately detect the temperature of the second end part of the heater 60 in the longitudinal direction of the heater 60.

It is noted that, there has been described above the case where the position located between the first end of the first heat conductive member 71 and the second end of the second heat conductive member 72 is set to the position located within the end area H3 in the longitudinal direction of the heater 60, however, the present disclosure is not limited to this. For example, the position located between the first end of the first heat conductive member 71 and the second end of the second heat conductive member 72 may be set to a position located inside the ends of the sheet S1 with the minimum width H2 in the longitudinal direction of the heater 60. That is, the position located between the first end of the first heat conductive member 71 and the second end of the second heat conductive member 72 may be set to a position within the area of the minimum width H2 in the longitudinal direction of the heater 60 in FIG. 2B. As a result of this, in the case where the fixing operation is executed for the sheet S1 with the minimum width H2, the temperature of the first heat conductive member 71 easily increases and it is possible to improve conducting effect in the fixing operation for the sheet S1 with various widths other than the width H2. As a result of this, it is possible to certainly detect the fixing temperature with high accuracy regardless of sheet sizes of the sheet S1.

First Modification

Figure 9A:
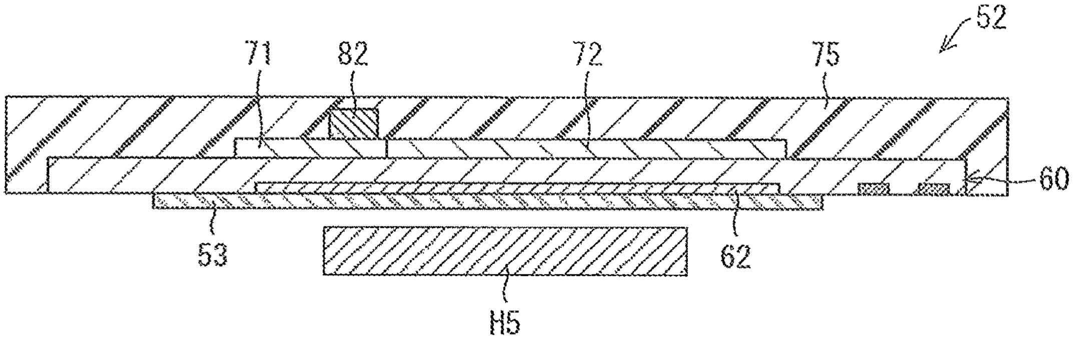
FIG. 9A is a side view illustrating a main configuration of a heating unit of the present disclosure.
Figure 9B:
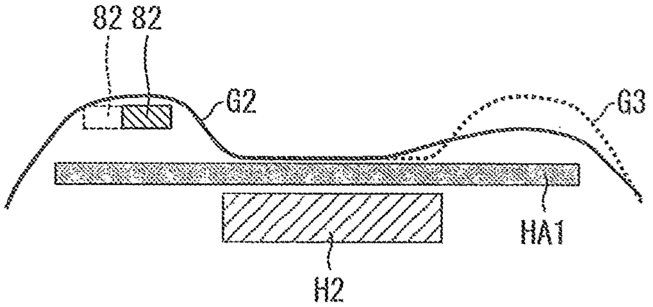
FIG. 9B is a view for explaining a temperature distribution in the fixing operation for the sheet with the minimum width in the present disclosure.

FIG. 9A is a side view illustrating a main configuration of a heating unit of a first modification of the present disclosure, and FIG. 9B is a view for explaining a temperature distribution in the fixing operation for the sheet S1 with the minimum width in the first modification. It is noted that the same reference numerals as used in the above described embodiment are used to designate the corresponding elements of the second embodiment, and an explanation of which is dispensed with.

In the first modification, as illustrated in FIG. 9A, the second temperature sensor 82 is disposed at a position within an area of the sheet S1 with the intermediate width H5 in the width direction of the sheet S in the heating unit 52. That is, a second end of the second temperature sensor 82 in the longitudinal direction of the heater 60 is located at a position farther from the second end of the substrate 61 in the longitudinal direction of the heater 60 than a second end of the area of the sheet S1 with the intermediate width H5 in the longitudinal direction of the heater 60. As a result of this, in the first modification, the second temperature sensor 82 is disposed at a position closer to the central position of the heater 60 in the longitudinal direction of the heater 60 than the position of the second temperature sensor 82 in the first embodiment. Specifically, a position of the second temperature sensor 82 shown by a broken line in FIG. 9B indicates a position thereof in the first embodiment, and a position of the second temperature sensor 82 shown by a solid line indicates a position thereof in the present first modification. As a result of this, in the case where the fixing operation is executed for the sheet S1 with the minimum width H2, the second temperature sensor 82 can detect increase of the temperature of the first heat conductive member 71 with higher accuracy with respect to the temperature distribution of the heater 60 shown by the waveform G2 illustrated in FIG. 9B.

Second Modification

Figure 10A:
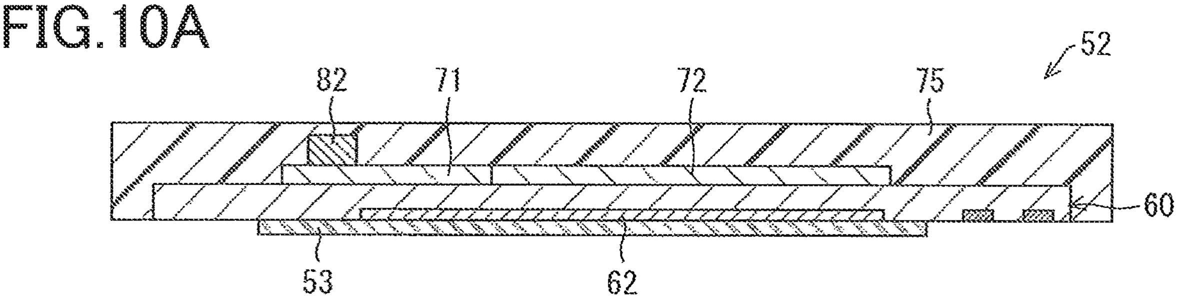
FIG. 10A is a side view illustrating a main configuration of a heating unit of the present disclosure.
Figure 10B:
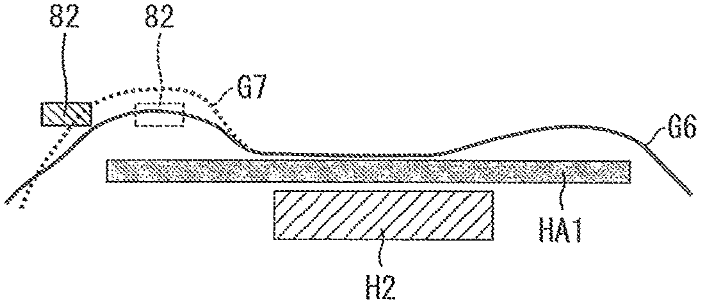
FIG. 10B is a view for explaining a temperature distribution in the fixing operation for the sheet with the minimum width in the present disclosure.

FIG. 10A is a side view illustrating a main configuration of a heating unit of a second modification of the present disclosure, and FIG. 10B is a view for explaining a temperature distribution in the fixing operation for the sheet with the minimum width in the present disclosure. It is noted that the same reference numerals as used in the above described embodiment are used to designate the corresponding elements of the second embodiment, and an explanation of which is dispensed with.

In the second modification, as illustrated in FIG. 10A, the second end of the first heat conductive member 71, which is one end of the first heat conductive member 71 farther from the second heat conductive member 72 than the other end of the first heat conductive member 71, is located outside ends of the resistance heating element 62 in the longitudinal direction of the heater 60 in the heating unit 52. Moreover, the second temperature sensor 82 is disposed at a position located outside the ends of the resistance heating element 62 in the longitudinal direction of the heater 60. In other words, the second end of the first heat conductive member 71 is disposed at a position closer to the second end of the substrate 61 than a second end of the resistance heating element 62 in the longitudinal direction of the heater 60. The second temperature sensor 82 is disposed at a position closer to the second end of the substrate 61 than the second end of the resistance heating element 62 in the longitudinal direction of the heater 60. As a result of this, in the second modification, in the case where the fixing operation is executed for the sheet S1 with the minimum width H2, the second temperature sensor 82 can detect increase of the temperature of the first heat conductive member 71 with higher accuracy with respect to the temperature distribution of the heater 60 shown by a waveform G6 illustrated in FIG. 10B.

It is noted that a waveform G7 illustrated in FIG. 10B is a temperature distribution of the heater 60 in a case where the second end of the first heat conductive member 71 is not extended to the position located outside the ends of the resistance heating element 62 such that the first heat conductive member 71 and the second temperature sensor 82 are disposed at the position inside the ends of the resistance heating element 62 in the longitudinal direction of the heater 60.

Moreover, in the second modification, the second temperature sensor 82 detects a temperature, as the temperature at the second end part of the heater 60, lower than a peak temperature in the waveform G7 indicating the temperature distribution of the heater 60 which is the same as the waveform G2 illustrated in FIG. 8C.

That is, in the second embodiment, it is possible to lower the temperature detected by the second temperature sensor 82 when compared with the case where the second end of the first heat conductive member 71, which is the one end of the first heat conductive member 71 father from the second heat conductive member 72 than the other end of the first heat conductive member 71, is located at the position located inside the ends of the resistance heating element 62 in the longitudinal direction of the heater 60.

As a result of this, in the second modification, it is possible to reduce a heat-resistant temperature of the second temperature sensor 82, and to achieve reducing cost of the heating unit 52 by using the second temperature sensor 82 having a lower heat-resisting property. Moreover, in the second modification, it is possible to make a threshold value for detecting a degree of increase of the temperature at the second end part of the heater 60 in the longitudinal direction of the heater 60 a small value in the controller. Accordingly, it is possible to easily simplify a configuration and an operation of the controller.

Second Embodiment

There will be described below another embodiment of the present disclosure. It is noted that the same reference numerals as used in the above described embodiment are used to designate the corresponding elements of the second embodiment, and an explanation of which is dispensed with.

Figure 11:
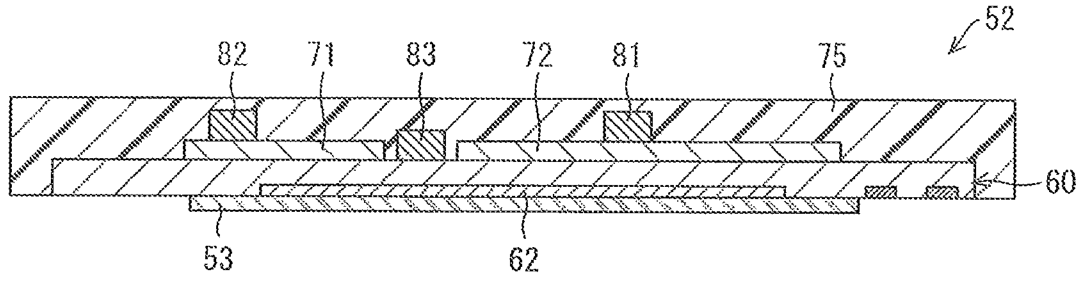
FIG. 11 is a side view illustrating a main configuration of a heating unit of the present disclosure.

FIG. 11 is a side view illustrating a main configuration of a heating unit of a second embodiment of the present disclosure. In FIG. 11, a difference between the first embodiment and the second embodiment is that the thermostat 83 is disposed at the position located between the first end of the first heat conductive member 71 and the second end of the second heat conductive member 72.

As illustrated in FIG. 11, the first heat conductive member 71 and the second heat conductive member 72 are arranged such that the second heat conductive member 72 is apart from the first heat conductive member 71 with a predetermined space therebetween. Moreover, the thermostat 83 is disposed at the predetermined space in a state in which the thermostat 83 is in contact the back surface 61A of the substrate 61.

According to the above described configuration, the second embodiment achieves the same effects as the first embodiment. Moreover, in the second embodiment, the thermostat 83 is in contact with the back surface 61A of the substrate 61 of the heater 60 as the same as the first embodiment. Accordingly, it is possible to easily assure a responsiveness of the thermostat 83 to the temperature of the heater 60. That is, since the thermostat 83 is in direct contact with the back surface 61A of the substrate 61 of the heater 60, the thermostat 83 can quickly detect increase of the temperature of the heater 60. Accordingly, the thermostat 83 can quickly detect whether the temperature of the heater 60 reaches the predetermined temperature as an interrupting temperature.

Moreover, in the second embodiment, since the thermostat 83 is disposed at the predetermined space located between the first end of the first heat conductive member 71 and the second end of the second heat conductive member 72, different from the first embodiment, the opening 72B formed in the second heat conductive member 72 in the first embodiment illustrated in FIG. 5B can be dispensed with. Accordingly, it is possible to easily place the thermostat 83 without cutting the second heat conductive member 72.

There has been described above the case where the heat conductive member 70 is divided into the first heat conductive member 71 and the second heat conductive member 72, however, it is noted that the present disclosure is not limited to this. That is, for example, if only the fixing device 45 includes the second temperature sensor 82 configured to detect the second end part of the heater 60 in the longitudinal direction of the heater 60 as the temperature sensor and the first heat conductive member 71 in contact with the second temperature sensor 82, and the position located between first end of the first heat conductive member 71 and the second heat conductive member 72 is set to the position closer to the second temperature sensor 82 than the central position of the heater 60 in the longitudinal direction of the heater 60, the number of heat conductive members divided from the heat conductive member 70 and positions located between or among the divided heat conductive members are not limited to the above described disclosure.

While the embodiment has been described above, it is to be understood that the disclosure is not limited to the details of the illustrated embodiment, but may be embodied with various changes, modifications and combinations, which may occur to those skilled in the art, without departing from the spirit and scope of the disclosure. The combinations obtained by the technical configurations disclosed in the embodiments are includes in the technical scope of the present disclosure.

What is claimed is:

1. A fixing device, comprising:

a heater including a substrate and a resistance heating element disposed on the substrate;

an endless belt configured to rotate around the heater;

a holder holding the heater;

a first heat conductive member and a second heat conductive member each disposed between the heater and the holder and arranged in a longitudinal direction of the heater such that a first end of the first heat conductive member and a second of the second heat conductive member in the longitudinal direction of the heater are adjacent to each other in the longitudinal direction of the heater, the first heat conductive member and the second heat conductive member being configured to conduct heat in the longitudinal direction of the heater; and a temperature sensor configured to detect a temperature at an end part of the heater in the longitudinal direction of the heater, wherein the temperature sensor is in contact with the first heat conductive member, wherein a position located between first end of the first heat conductive member and the second end of the second heat conductive member in the longitudinal direction is closer to the temperature sensor than a central position of the resistance heating element in the longitudinal direction of the heater, and wherein the temperature sensor is disposed at a position located outside ends of an area where a sheet with a minimum width usable in the fixing device passes.

2. The fixing device according to claim 1, wherein the first end of the first heat conductive member in the longitudinal direction of the heater is closer to the temperature sensor than the central position of the resistance heating element in the longitudinal direction of the heater.

3. The fixing device according to claim 1, wherein the second end of the second heat conductive member in the longitudinal direction of the heater is closer to the temperature sensor than the central position of the resistance heating element in the longitudinal direction of the heater.

4. The fixing device according to claim 1, wherein the position between the first end of the first heat conductive member and the second end of the second heat conductive member is disposed at a position located inside ends of an area where a sheet with a minimum width usable in the fixing device passes.

5. The fixing device according to claim 1, wherein the position between the first end of the first heat conductive member and the second end of the second heat conductive member is disposed at a position located outside the ends of the area where the sheet with the minimum width usable in the fixing device passes and inside ends of an area where a sheet with an intermediate width usable in the fixing device passes.

6. The fixing device according to claim 1, wherein the temperature sensor is disposed at an end part of the resistance heating element in the longitudinal direction of the heater.

7. The fixing device according to claim 1, wherein the temperature sensor is disposed within an area where a sheet with an intermediate width usable in the fixing device passes.

8. The fixing device according to claim 1, wherein a second end of the first heat conductive member in the longitudinal direction is disposed at a position located outside ends of the resistance heating element in the longitudinal direction of the heater, and wherein the temperature sensor is disposed at a position located outside the ends of the resistance heating element in the longitudinal direction of the heater.

9. The fixing device according to claim 1, wherein the second end of the first heat conductive member is disposed at a position closer to a second end of the substrate than a second end of the resistance heating element in the longitudinal direction of the heater, and wherein the temperature sensor is disposed at a position closer to the second end of the substrate than the second end of the resistance heating element in the longitudinal direction of the heater.

10. The fixing device according to claim 1, further comprising a thermostat configured to interrupt energization to the resistance heating element when the heater is abnormally increased in temperature, wherein the thermostat is disposed at the position located between first end of the first heat conductive member and the second end of the second heat conductive member in the longitudinal direction so as to be in contact with the substrate.

11. The fixing device according to claim 1, wherein the first heat conductive member and the second heat conductive member are metal sheets.

12. An image forming apparatus comprising a fixing device, the fixing device including:

a heater including a substrate and a resistance heating element disposed on the substrate;

an endless belt configured to rotate around the heater;

a holder holding the heater;

a first heat conductive member and a second heat conductive member each disposed between the heater and the holder and arranged in a longitudinal direction of the heater such that a first end of the first heat conductive member and a second of the second heat conductive member in the longitudinal direction of the heater are adjacent to each other in the longitudinal direction of the heater, the first heat conductive member and the second heat conductive member being configured to conduct heat in the longitudinal direction of the heater; and a temperature sensor configured to detect a temperature at an end part of the heater in the longitudinal direction of the heater, wherein the temperature sensor is in contact with the first heat conductive member, wherein a position located between first end of the first heat conductive member and the second end of the second heat conductive member in the longitudinal direction is closer to the temperature sensor than a central position of the resistance heating element in the longitudinal direction of the heater, and wherein the temperature sensor is disposed at a position located outside ends of an area where a sheet with a minimum width usable in the fixing device passes.

13. The image forming apparatus according to claim 12, wherein the first heat conductive member and the second heat conductive member are metal sheets.

14. A fixing device, comprising:

a heater including a substrate and a resistance heating element disposed on the substrate;

an endless belt configured to rotate around the heater;

a holder holding the heater;

a first heat conductive member and a second heat conductive member each disposed between the heater and the holder and arranged in a longitudinal direction of the heater such that a first end of the first heat conductive member and a second end of the second heat conductive member in the longitudinal direction of the heater are adjacent to each other in the longitudinal direction of the heater, the first heat conductive member and the second heat conductive member being configured to conduct heat in the longitudinal direction of the heater; and a temperature sensor configured to detect a temperature at an end part of the heater in the longitudinal direction of the heater, wherein the temperature sensor is in contact with the first heat conductive member, wherein a position located between the first end of the first heat conductive member and the second end of the second heat conductive member in the longitudinal direction is closer to the temperature sensor than a central position of the resistance heating element in the longitudinal direction of the heater, and wherein the position between the first end of the first heat conductive member and the second end of the second heat conductive member is disposed at a position located outside ends of an area where a sheet with a minimum width usable in the fixing device passes and inside ends of an area where a sheet with an intermediate width usable in the fixing device passes.

* * * * *